United States Patent
Fawkes

[11] 3,717,171
[45] Feb. 20, 1973

[54] LIGHT OPERATED VALVE POSITION INDICATING SYSTEM

[75] Inventor: Donald G. Fawkes, Aurora, Ill.

[73] Assignee: Henry Pratt Company

[22] Filed: Sept. 20, 1971

[21] Appl. No.: 181,907

[52] U.S. Cl. .................... 137/552, 137/554, 137/559
[51] Int. Cl. ............................................... F16k 37/00
[58] Field of Search ....137/551, 552, 552.5, 559, 554

[56] References Cited

UNITED STATES PATENTS

| | | | |
|---|---|---|---|
| 2,529,605 | 11/1950 | Gustafson | 137/551 X |
| 3,331,392 | 7/1967 | Davidson et al. | 137/559 |
| 1,408,611 | 3/1922 | Larner | 137/554 |

Primary Examiner—Henry T. Klinksiek
Attorney—Hofgren, Wegner, Allen, Stellman & McCord

[57] ABSTRACT

A valve position indicator particularly suited for use with valves having a first shaft driven by an operator and a second stub shaft for journaling the valve member. Either one of the shafts is provided with a transverse light transmitting portion, normally in the form of an aperture therethrough and that portion of the shaft is flanked by a pair of aligned light pipes. One of the light pipes may be associated with a light source while the other is provided with an indicating end with the result that when the valve is in one position, light may pass from the source to the indicator through the aperture in the shaft, while for al other positions of the valve, the light transmitting path will be broken. Observance of the indicating end of the light pipe provides a remote indication of the position of the valve.

4 Claims, 3 Drawing Figures

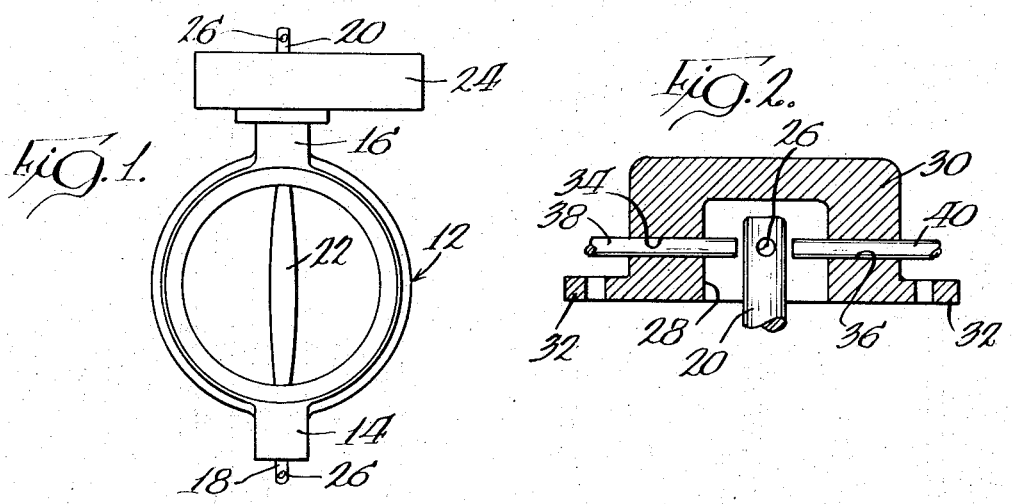
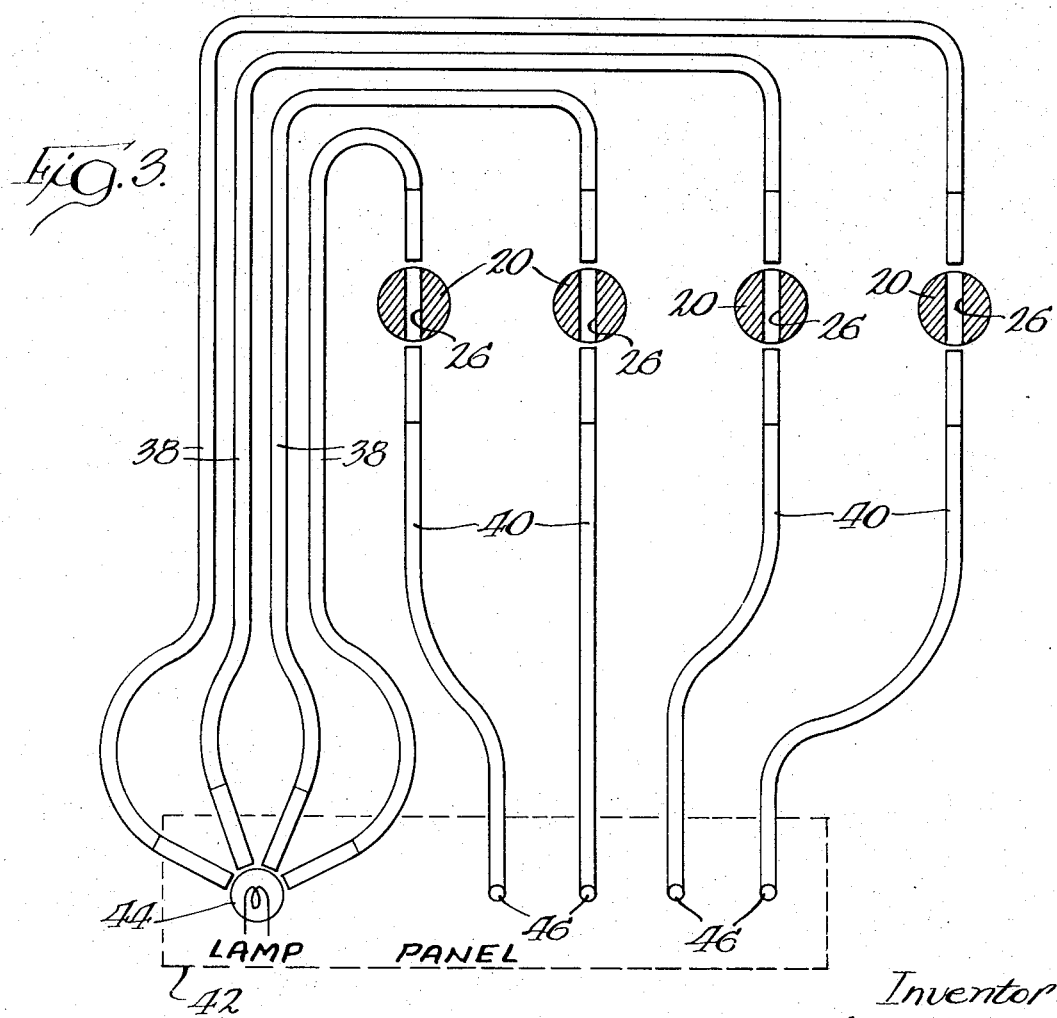

LIGHT OPERATED VALVE POSITION INDICATING SYSTEM

BACKGROUND OF THE INVENTION

This invention relates to valve position indicators for valves of various sizes utilized in water distribution for fire protection systems or the like such as butterfly valves, ball valves, plug valves, cone valves or any other type of valve having a shaft which rotates through about 90° when the valve is moved from its fully open position to its fully closed position or vice versa.

For many years, there has existed a problem in conjunction with the use of such valves insofar as it has been difficult to ascertain the particular position of a valve member within a valve casing without actually inspecting the valve itself. Furthermore, even inspection of the actual valve can be deceptive. For example, where a valve has a manual or motorized operator for driving the valve control shaft, should the valve drive shaft shear, a not unheard of occurrence, one inspecting the position of the operator as an indication of actual valve position would be misled as there would no longer be a driving connection between the operator and a valve member.

As a result, various sytems for indicating the position of a valve within a valve casing have evolved and generally involve electrically sensitive systems. For example, one system monitors inductance between two electrical conductors, one movable with the valve member. Another electrically monitors magnetic coupling caused by a magnetically conducting element movable with the valve member. Such systems operate extremely well for their intended purpose but are susceptible to possible disadvantages by reason of their reliance upon electricity. For example, in many water distribution or fire protection systems, the valves are buried and, as a result, steps must be taken to protect the system from seepage of ground water. While in most instances the disabling of an electrical system by ground water seepage can be adequately protected against, there remains a possibility that such seepage could cause a short in the electrical system thereby disabling the indicator.

SUMMARY OF THE INVENTION

It is the principal object of the invention to provide a new and improved valve position indicating system. More particularly, it is an object of the invention to provide such a system that is not susceptible to malfunction or disabling by deterioration due to conditions in the environment in which the system is used.

The exemplary embodiment of the invention achieves the foregoing object by means of a construction employing light as the sensing and indicating medium. More particularly, valves of the foregoing types include a valve casing journaling one or more shafts affixed to a valve member within the casing and movable between open and closed positions. The valve member, and in the exemplary embodiment, the shaft journaling the same, is provided with a light transmitting portion normally in the form of an aperture. A pair of light pipes each have ends adjacent the shaft portion having the aperture so that for one position of the shaft, the ends of the light pipes may "see" each other through the aperture, while for other positions of the valve and the shaft, the shaft blocks the light path from one light pipe to the other.

One of the light pipes has its other end associated with a source of light while the other light pipe has its other end serving as an indicating means. When the valve is in the position with the aperture aligned with the light pipes, light from the source will pass through the first light pipe, the aperture, and the second light pipe to the indicating end of the latter to provide an indication that the valve is in a particular position. When the valve is in other positions, the path of light transmittance will be broken so that the indicating end of the second light pipe, by reason of the fact that the same will be non-illuminated, provides an indication that the valve is not in the predetermined position.

According to the exemplary embodiment, the system is designed for use with a plurality of such valves and employs a single light source associated with a plurality of the first light pipes and the indicating ends of the second light pipes may be grouped together in a single, remotely located control panel whereat the positions of a plurality of valves may be monitored.

Other objects and advantages of the invention will become apparent from the following specification taken in conjunction with the accompanying drawings.

DESCRIPTION OF THE DRAWINGS

FIG. 1 is a side elevation of a valve made according to the invention;

FIG. 2 is an enlarged, vertical section of a portion of the indicating system associated with the valve; and FIG. 3 is a schematic of a multiple valve, indicating system.

DESCRIPTION OF THE PREFERRED EMBODIMENT

One form of a valve with which the system may be employed is illustrated in FIG. 1 and is seen to include a valve body or casing, generally designated 12 through which a fluid, generally a liquid, may pass when the same is connected in a fluid line in a conventional fashion. The casing 12 includes diametrically opposed trunnion bosses 14 and 16 each providing bearing surfaces for respective trunnions 18 and 20 secured to a valve member 22. As just described, a conventional butterfly valve is defined.

The upper trunnion boss 16 may also mount a housing 24 for a valve operator of any desired constriction. For example, the housing 24 may include a motor for driving the valve 22 between the open position shown in FIG. 1 and a closed position or, if desired, a manual operating mechanism may be included with the housing 24.

Finally, it will be noted, that one or the other of the trunnions 18 and 20, or both, extends beyond its associated trunnion boss and the extension of the same includes a transversely extending aperture 26 which defines a light transmitting portion on the valve member.

Turning now to FIG. 2, a portion of the trunnion 20 including the aperture 26 is illustrated as being located within a recess 28 of a housing 30. The housing includes outwardly projecting eyelets 32 through which bolts (not shown) may be used to secure the same either to the operator housing 24 or the trunnion boss 14.

The housing 30 includes aligned bores 34 and 36 which are adapted to confront the trunnion 20 at the point in the same whereat the aperture 26 is located. The bores 34 and 36 receive the ends of associated conventional light pipes 38 and 40 respectively to mount the same in alignment with each other and with the aperture 26 when the trunnion 20 is rotated 90° from the position shown in FIG. 2.

The foregoing structure may be implemented in a remote position indicating system as that schematically illustrated in FIG. 3. In particular, there may be provided a monitoring panel 42 housing a light source such as an electrical, incandescent lamp 44. Clustered about the lamp 44 are the ends of the light pipes 38 remote from the valve so that the same receive light from the source for transmission to the housing 30. The ends of the second light pipes 40 remote from the apertures 26 may be returned to the panel 42 to terminate in indicating ends 46. Thus, with the trunnions 20 of the valve in the position illustrated in FIG. 3, light from the lamp 42 will be transmitted by the first light pipes 38 through the apertures 26 to the second light pipes 40 where it can be observed at the indicating ends 46 thereof. As illustrated in FIG. 3, a single source of light 44 may be employed with a plurality of valves so that the condition of each of the valves may be individually determined at a remote monitoring station housing the panel 42.

Normally, it will be preferable to arrange the aperture 26 on the trunnion 20 (or the trunnion 18) such that light will be transmitted to the indicating ends 46 whenever the valve is in a fully opened position as illustrated in FIG. 1. However, in some instances it may be desirable to provide the positive indication when the valve is fully closed. Of course, by the provision of a second aperture in the valve along with accompanying first and second light pipes, the system could be arranged to provide positive indications when the valve is both in the fully open position and the fully closed position.

It should also be recognized that the system is not limited to use with the upper trunnion 20. In fact, in many instances, it may be preferable to use the lower trunnion 18 since the same is not driven and there is less likelihood of the same shearing from the valve 22 than is the case with the upper trunnion 20. And while the system is depicted as including the housing 30, which may be secured to the lower trunnion boss 14 or the valve operator housing 24, it will be understood that the housing 30 may be omitted entirely if desired if appropriate means are provided in the trunnion bosses or the operating housing 24 for mounting the light pipes in the manner described above.

It will further be appreciated that the abovedescribed system is extremely reliable in that it will be unaffected by ground water seepage. The conventional materials customarily employed to form the light pipes 38 and 40 are unaffected by such moisture and even should seepage occur such that ground water filled the cavity 28 of the housing 30, the light path would not be appreciably obstructed assuming of course that the aperture 26 was in alignment with the ends of the light pipes 38 and 40.

I claim:

1. A valve position indicating system comprising: a valve casing; valve means within said casing and movable between an open position whereat fluid may flow through the casing and a closed position blocking fluid flow through the casing; means defining a light transmitting portion on said valve means; a source of light remote from said casing; a first light pipe extending from said source to said casing and aligned with said light transmitting means when said valve means is in a particular position within said casing; and a second light pipe aligned with said first light pipe and on the opposite side of said valve means, said second light pipe terminating in indicating means; whereby when said valve means is in said particular position with said transmitting means aligned with said light pipes, said indicating means will be illuminated by light from said source traveling through said first light pipe, said light transmitting portion and said second light pipe and when said valve means is in another position non-aligned with said first light pipe, light from said source will be blocked by said valve means and will not reach said indicating means so that said indicating means provides an indication of the position of said valve means within said casing.

2. The system of claim 1 wherein said valve casing includes a pair of oppositely disposed bearing surfaces and said valve means comprises a valve member having trunnions in respective ones of said bearing surfaces; said light transmitting means comprising an aperture in one of said trunnions.

3. The valve position indicating system of claim 2 further including a plurality of valves defined by a plurality of valve casings and a plurality of said valve means; said system further including a plurality of said first light pipes, one for each valve, and a plurality of said second light pipes, one for each valve; said light source being common to said plurality of first light pipes; the indicating means of said second light pipes terminating in a common display panel whereby the positions of a plurality of remotely located valves may be ascertained at a single location.

4. A valve including a valve position indicating system comprising: means defining a valve casing having opposed bearing surfaces; a valve within said casing and having trunnions received within respective ones of said bearing surfaces, one of said trunnions including an aperture extending therethrough to define a light transmitting passage; a first light pipe having an end adjacent said one trunnion and adapted to be aligned with said aperture therein for one position of said valve within said casing; and a second light pipe having an end adjacent said one trunnion and adapted to be aligned with said aperture therein when said valve is in said one position within said casing whereby for said one position of said valve within said casing, light from a source may pass from said first light pipe through said aperture and to said second light pipe to provide an indication that said valve is in said one position and whereby when said valve is in another position within said casing, said aperture will be non-aligned with said light pipes to preclude the passage of light from said first light pipe to said second light pipe.

* * * * *